Sept. 15, 1925.

H. A. HOLMES

PUMP

Filed June 25, 1923

1,554,092

Herbert A. Holmes
INVENTOR

BY Victor J. Evans
ATTORNEY

WITNESS: L. B. Middleton

Patented Sept. 15, 1925.

1,554,092

UNITED STATES PATENT OFFICE.

HERBERT A. HOLMES, OF EL DORADO, ARKANSAS, ASSIGNOR OF ONE-HALF TO EARNEST F. HOLMES, OF EL DORADO, ARKANSAS.

PUMP.

Application filed June 25, 1923. Serial No. 647,729.

*To all whom it may concern:*

Be it known that I, HERBERT A. HOLMES, a citizen of the United States, residing at El Dorado, in the county of Union and State of Arkansas, have invented new and useful Improvements in Pumps, of which the following is a specification.

This invention relates to a pump, the general object of the invention being to provide the pump with separating means for separating oil and the like from water and other impurities.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
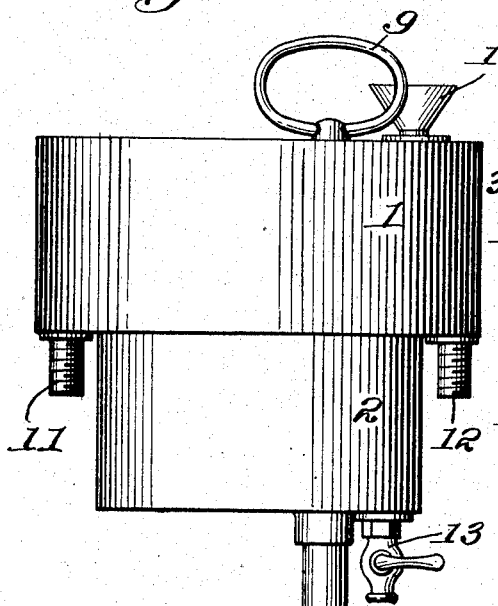
Figure 2:
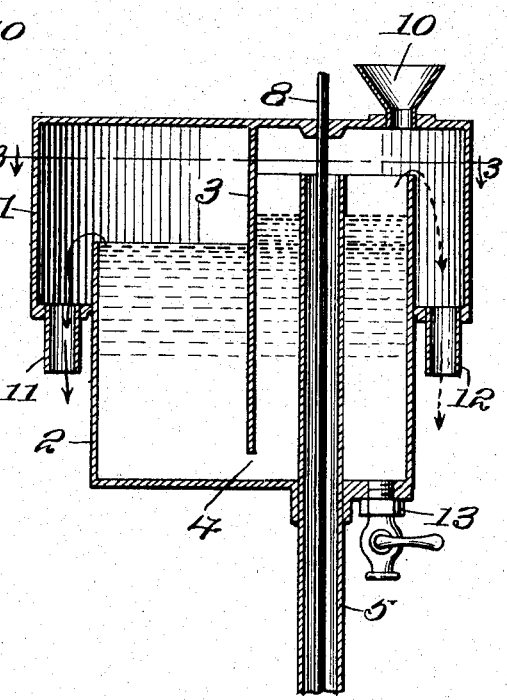
Figure 3:
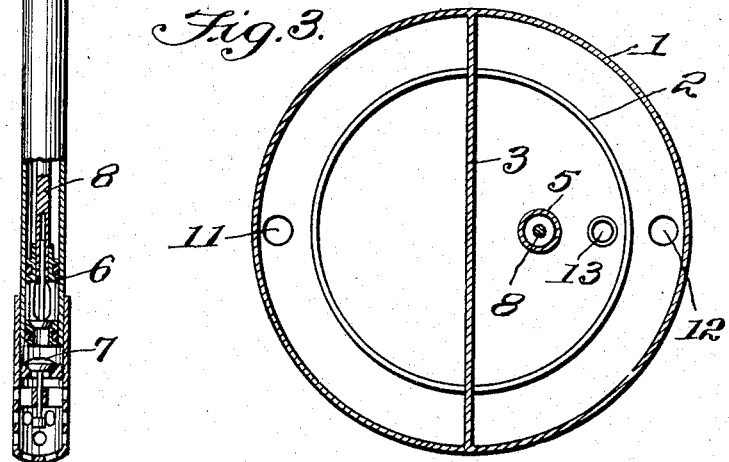

Figure 1 is a side view of the invention.
Figure 2 is a longitudinal sectional view.
Figure 3 is a section on line 3—3 of Figure 2.

In these views 1 indicates a large casing and 2 indicates a small casing which projects into the lower part of the first casing. The upper end of the casing 2 is open and a partition 3 divides each casing into a pair of chambers, said partition terminating short of the bottom of the casing 2 so as to leave a space 4 for connecting the two chambers of said casing together. The upper end of the casing 2 is cut off on one side of the casing so that one chamber of this casing is of less height than the other. A pump tube 5 is connected with the casing 2 and passes through the bottom of the same. The top of the tube terminates adjacent the upper end of the long chamber of said casing. The piston of the pump is shown at 6, the valves being shown at 7. The piston rod 8 passes through a hole in the top of the casing 1 and is provided with a handle 9 so that it can be reciprocated. The top of the casing 1 is provided with an air vent 10 and its lower end is provided with a water outlet 11 and an oil outlet 12, the oil outlet being arranged in one of the chambers of the casing 1 while the water outlet 11 is arranged in the other chamber. The casing 2 is provided with a drain outlet 13.

From the foregoing it will be seen that when water and oil, for instance, is pumped into the device by means of the pump attachment the oil and water will flow into the first chamber of the casing 2 with the oil on top of the water. The water will therefore pass through the space 4 into the other chamber of the casing and as the level of oil and water rises in the device the water will overflow the cut-away top of the casing 2 and flow into the casing 1 and will flow from this casing 1 through the outlet 11. Thus the water is separated from the oil and the pumping action can continue until no more water will flow from the outlet 11. The oil which overflows the casing 2 will drop into the casing 1 and will escape through the outlet 12. When the device is used for pumping out a tank or the like this outlet 12 can be connected by a hose or the like with the tank so that the oil will return to the tank after having the water separated therefrom.

This device can be used for pumping water, sand and sediment laden oil from the bottom of oil tanks, barrels and other containers.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising upper and lower cylindrical casings, the lower casing being of less diameter than the upper casing and extending through the bottom of the upper casing, a partition connected with the upper casing and extending to a point a short distance from the bottom of the lower casing, said partition dividing each casing into two halves, one half of the lower casing being of greater height than the other half, a drain tube in the bottom of each half of the upper casing, a drain cock in the bottom of the lower casing, and an inlet tube passing through the bottom of the lower casing to a point flush with the high part of said casing.

In testimony whereof I affix my signature.

HERBERT A. HOLMES.